United States Patent Office 3,138,599
Patented June 23, 1964

3,138,599
GLUTARIMIDE DERIVATIVES AND PROCESS FOR THE PREPARATION THEREOF
Francis Johnson, Newton Lower Falls, and William D. Gurowitz, Natick, Mass., assignors to The Dow Chemical Company, Midland, Mich., a corporation of Delaware
No Drawing. Filed Nov. 1, 1961, Ser. No. 149,209
11 Claims. (Cl. 260—281)

The present invention is directed to a process for preparing glutarimide derivatives.

It is an object of the present invention to provide novel glutarimide derivatives. It is also an object of this invention to provide a process for preparing cycloheximide and also other derivatives of glutarimide.

We discovered that unsaturated ester derivatives of 1-oxo-2-(3-glutarimidyl) ethane are selectively reduced with a metal hydride reducing agent, in accordance with equation of 1. Equation 2 illustrates the preparation of cycloheximide products utilizing the corresponding cyclic derivative of glutarimide. Equation 3 illustrates preferred reactants and the preparation of preferred products of this invention.

(Equation 1)

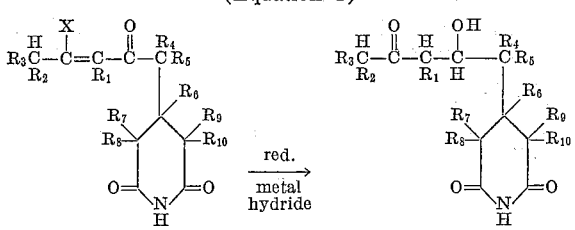

(Equation 2)

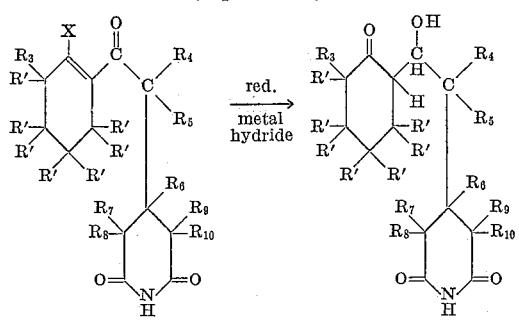

(Equation 3)

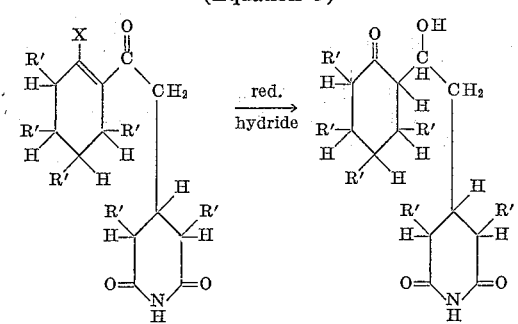

$R_1$–$R_{10}$ may be hydrogen or any substituting group or radical, such as alkyl, aryl, alkoxyl, acyloxyl, dialkylamino, halogen, etc. These are exemplified by methyl, butyl, benzyl, octyl, phenyl, diethylamino, phenoxyl, methoxyl, etc. The permissible substituents are those that do not react with the metal hydride or any other component of the reaction mixture under the process conditions. The preferred $R_3$–$R_{10}$ groups are hydrogen, lower alkyl and lower alkoxyl. The $R_1$ and $R_2$ groups may be cyclized or fused to form cyclic moieties. These moieties may, and usually do, contain substituting groups on the ring carbons. The preferred $R_1$ and $R_2$ containing moieties have the formula

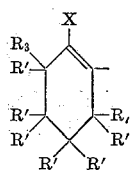

The R′ groups are defined in the same manner as $R_3$–$R_{10}$. It is preferred that one R group on each ring carbon should be hydrogen. Each R group in a given compound may be the same as or different from the other R groups. Products of the type illustrated in Equations 2 and 3 are known as cycloheximides. X is an acyl group; preferably derived from a short chain carboxylic acid.

The unsaturated ester derivatives of 1-oxo-2-(3-glutarimidyl) ethane utilized as the reactants herein may be prepared by acylating the product prepared by treating a glutarimide β-acetyl chloride with an enamine of a cyclic ketone or of a secondary amine in a solvent containing a tertiary ammonium base. The process for preparing said unsaturated ester derivatives as well as a number of examples thereof, is disclosed in Francis Johnson's copending application filed November 1, 1961, entitled "Cyclic Compounds III," Serial No. 149,162. The disclosure of said application is by this reference incorporated herein. The unsaturated ester derivatives may also be prepared utilizing a dehydrocycloheximide and reacting it with an ester such as isopropenyl acetate in the presence of a slightly acid solution.

Although metal hydrides (including boron as a metal) such as sodium borohydride, lithium aluminum hydride, and the hydrocarbontin hydrides generally are useful, the preferred reducing agents are the hydrocarbontin hydrides, such as, dibutyltin dihydride, tributyltin hydride, and particularly diphenyltin dihydride.

The reduction of the unsaturated ester derivatives is carried out by reacting the metal hydride with the reactant; the process of reacting is usually a mixing of the two materials. It is necessary to use an excess of the stoichiometric amount of the metallic hydride to obtain complete utilization of the glutarimide reactant. Reaction conditions are not critical. Room temperatures are often conveniently used. Other temperatures between —80° and temperatures below the decomposition temperature of the desired reaction product may be utilized. The maximum preferred temperature for most products is 80° C. The reaction is generally carried out in the presence of an inert solvent, including such hydrocarbon solvents as aliphatic, cycloaliphatic, or aromatic hydrocarbons; or preferably an ether such as tetrahydrofuran, 2-methyltetrahydrofuran, tetrahydropyran, diethyl ether, dibutyl ether, etc. Atmospheric pressure is used, although pressure may be desirable for specific reactants.

For purposes of further explaining the invention to those skilled in the art, the following illustrative examples are given:

*Example 1*

1-oxo-1-[(2-acetoxy-3,5-dimethylcyclohexenyl)-2-(3-glutarimidyl)] ethane, 1.07 grams, 0.0033 mole, which had been prepared via acylation of the morpholine enamine of 2,4-dimethylcyclohexanone, was dissolved in 25 ml. of tetrahydrofuran. To this stirred solution was added a solution of 5.1 grams, 0.0186 mole, of diphenyltin dihydride in 45 ml. of tetrahydrofuran. The mixture was stirred for 2½ days. Diethylamine (1.5 ml.) was added to destroy excess diphenyltin dihydride. The solution was refluxed for two hours whereupon a yellow solid precipitated out. This mixture was filtered and the tetrahydrofuran removed from the clear filtrate under vacuum. The residue, a yellow oil weighing 1.8 grams, was chromatographed on silica gel. With a 1:1 mixture of ethyl acetate and methylene chloride a clear colorless oil weighing 0.57 gram, 61% yield of 3-[2-(3,5 - dimethyl - 2 - oxocyclohexyl) - 2 - hydroxyethyl] glutarimide was obtained which had an infrared spectrum very similar to cycloheximide, i.e., it had an hydroxide band, a split NH band, carbonyl bands, absence of any double bond, etc.

*Example 2*

Following the procedure of Example 1, 1-oxo-1-[(2-acetoxycyclohexenyl)-3-glutarimidyl)] ethane is reduced to 3-[2-(2-oxocyclohexyl)-2-hydroxyethyl] glutarimide.

*Example 3*

Following the procedure of Example 1, 1-oxo-1-[(2-acetoxy - 3 - methylcyclohexenyl) - 2 - (3 - glutarimidyl)] ethane is reduced to 3-[2-(3-methyl-2-oxocyclohexyl)-2-hydroxyethyl] glutarimide.

*Example 4*

Following the procedure of Example 1, 1-oxo-1-[(2-benzoyloxy-4,5-diethylcyclohexenyl)-2-(3 - glutarimidyl)] ethane is reduced to 3-[2-(4,5-diethyl-2-oxocyclohexyl)-2-hydroxyethyl] glutarimide.

*Example 5*

Following the procedure of Example 1, 1-oxo-1-[(2-acetoxy - 5 - ethoxycyclohexenyl) - 2 - (3 - glutarimidyl)] ethane is reduced to 3-[2-(5-ethoxy-2-oxocyclohexyl)-2-hydroxyethyl] glutarimide.

*Example 6*

Following the procedure of Example 1, 1-oxo-1-[(2-butoxy - 3,5 - dibutylcyclohexenyl) - 2 - (3-glutarimidyl)] ethane is reduced to 3-[2-(3,5-dibutyl-2-oxocyclohexyl)-2-hydroxyethyl]glutarimide.

*Example 7*

Following the procedure of Example 1, 1-oxo-1-[(2-acetoxybutene-1)-2-(3-glutarimidyl)] ethane is reduced to 3-[2-(2-butanone)-2-hydroxyethyl] glutarimide.

*Example 8*

Following the procedure of Example 1, 1-acetoxy-2-[1 - oxo - 2 - (3 - glutarimidyl) ethyl]-3,4 - dihydronaphthalene is reduced to 2-[1-hydroxy-2-(3-glutarimidyl) ethyl] tetralone-1.

The products of the examples are also produced using solvents such as diethyl ether, and benzene. Dibutyltin dihydride and the equivalent metal hydrides, such as, sodium borohydride and lithium aluminum hydride are also used in place of the preferred diphenyltin dihydride in the reduction reaction.

The products of our process are biologically active. They are useful as fungicides and rodent repellents. Certain of the cycloheximides have fungicidal effects with little or no concomitant phytotoxicity.

Although our invention has been illustrated by specific examples, it is to be understood that it includes all modifications and variations that come within the scope of the appended claims.

What is claimed is:

1. The process for preparing glutarimide derivatives comprising reacting, in an inert solvent, a compound having the formula

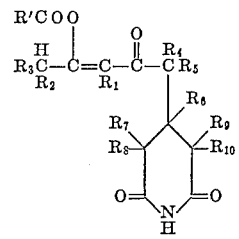

with a metal hydride to form the corresponding glutarimide derivative having the formula

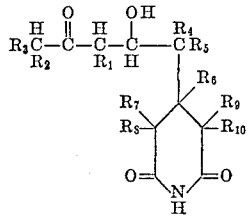

wherein the numbered R groups are selected from the group consisting of hydrogen, lower alkyl, and lower alkoxy, and R' is selected from the group consisting of lower alkyl and phenyl.

2. The process of claim 1 in which the solvent is an ether and the metal hydride is a hydrocarbontin hydride.

3. The process of claim 2 in which the hydride is diphenyltin dihydride.

4. The process for preparing cycloheximides comprising reacting, in an inert solvent, a compound having the formula

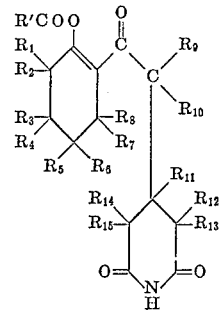

wherein the numbered R groups are selected from the group consisting of hydrogen, lower alkyl, and lower alkoxy, and R' is selected from the group consisting of lower alkyl and phenyl, with a metal hydride to form the corresponding cycloheximide.

5. The process of claim 4 in which the solvent is an ether and the metal hydride is a hydrocarbontin hydride.

6. The process of claim 5 in which the hydride is diphenyltin dihydride.

7. The process for preparing cycloheximides comprising reacting at a temperature below 80° C., in an inert solvent, a compound having the formula

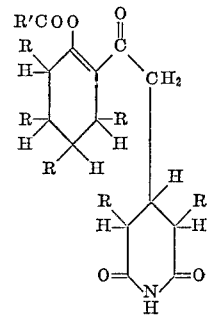

wherein the R groups are selected from the group consisting of hydrogen, lower alkyl, and lower alkoxy, and R' is selected from the group consisting of lower alkyl and phenyl, with a metal hydride to form the corresponding cycloheximide.

8. The process of claim 7 in which the solvent is an ether and the metal hydride is a hydrocarbontin hydride.

9. The process of claim 8 in which the hydride is diphenyltin dihydride.

10. 3 - [2-(5-ethoxy-2-oxocyclohexyl)-2-hydroxyethyl] glutarimide.

11. 2-[1-hydroxy-2-(3-glutarimidyl)ethyl]tetralone-1.

References Cited in the file of this patent

FOREIGN PATENTS 803,178    Great Britain _____ Oct. 22, 1958

OTHER REFERENCES

Frohardt et al., Jour. Amer. Chem. Soc., vol. 81, pp 5500–6 (1959).

Herr, Jour. Amer. Chem. Soc., vol. 81, pp. 2595–6 (1959).

Kornfeld et al., Jour. Amer. Chem. Soc., vol. 71, pp. 150–9 (1949).